United States Patent [19]
Patel et al.

[11] Patent Number: 6,115,810
[45] Date of Patent: Sep. 5, 2000

[54] BI-LEVEL BRANCH TARGET PREDICTION SCHEME WITH MUX SELECT PREDICTION

[75] Inventors: Sanjay Patel, Fremont; Adam R. Talcott, San Jose; Rajasekhar Cherabuddi, Cupertino, all of Calif.

[73] Assignee: Sun Microsystems, Inc., Palo Alto, Calif.

[21] Appl. No.: 09/154,007

[22] Filed: Sep. 16, 1998

[51] Int. Cl.⁷ ........................................... G06F 9/26
[52] U.S. Cl. ..................... 712/239; 712/233; 712/236; 712/237
[58] Field of Search ................... 712/233, 235, 712/237, 239, 236

[56] References Cited

U.S. PATENT DOCUMENTS

| | | | |
|---|---|---|---|
| 4,984,154 | 1/1991 | Hanatani et al. | 712/240 |
| 5,515,518 | 5/1996 | Stiles et al. | 712/239 |
| 5,875,324 | 2/1999 | Tran et al. | 712/238 |
| 5,995,749 | 11/1999 | Tran | 395/586 |

*Primary Examiner*—Daniel C. Pan
*Assistant Examiner*—Dzung C. Nguyen
*Attorney, Agent, or Firm*—Park & Vaughan LLP

[57] ABSTRACT

One embodiment of the present invention provides a system for predicting an address of an instruction following a branch instruction in a computer instruction stream. This system receives a current address specifying an address of a current instruction. It uses this current address (or possibly a preceding address) to generate a first select signal, which is used to select a first predicted address of an instruction following the current instruction in the computer instruction stream. At the same time the system generates a second select signal, which takes more time to generate than the first select signal but achieves a more accurate selection for a predicted address of the instruction following the current instruction. The system assumes that the first predicted address is correct and proceeds with a subsequent instruction fetch operation using the first predicted address. Next, the system compares the first select signal with the second select signal. If the first select signal is the same as the second select signal, the system allows the subsequent instruction fetch operation to proceed using the first predicted address. Otherwise, the system uses the second select signal to select a second predicted address, and delays the subsequent instruction fetch operation so that the instruction fetch operation can proceed using the second predicted address. This bi-level architecture allows branch prediction work efficiently even at the higher clock frequencies that arise as semiconductor technologies continue to improve.

25 Claims, 6 Drawing Sheets

|  | | | | | | | | |
|---|---|---|---|---|---|---|---|---|
| ROW 1 | ADDRESS GENER-ATION 302 | I-CACHE-0 304 | I-CACHE-1 306 | I-CACHE-2 308 | | | | |
| ROW 2 | BRANCH TARGET LOOKUP 310 | ADDRESS GENER-ATION 312 | I-CACHE-0 314 | I-CACHE-1 316 | I-CACHE-2 318 | | | |
| ROW 3 | | ADDRESS GENERATION 320 | I-CACHE-0 322 | I-CACHE-1 324 | I-CACHE-2 326 | | | |
| ROW 4 | | BRANCH TARGET LOOKUP 328 | ADDRESS GENER-ATION 330 | I-CACHE-0 332 | I-CACHE-1 334 | I-CACHE-2 336 | | |
| ROW 5 | | | ADDRESS GENERATION 338 | I-CACHE-0 340 | I-CACHE-1 342 | I-CACHE-2 344 | | |
| ROW 6 | | | BRANCH TARGET LOOKUP 346 | ADDRESS GENER-ATION 348 | I-CACHE-0 350 | I-CACHE-1 352 | I-CACHE-2 354 | |

Fetch Group 1: Level 1 (cols I-CACHE-0 304 through I-CACHE-2 308 area), Level 2 (next group)
Fetch Group 2: Level 1, Level 2
Fetch Group 3: Level 1, Level 2

FIG. 3

BI-LEVEL BRANCH TARGET PREDICTION SCHEME WITH MUX SELECT PREDICTION

RELATED APPLICATION

The subject matter of this application is related to the subject matter in a co-pending non-provisional application by the same inventor(s) as the instant application and filed on the same day as the instant application entitled, "Bi-Level Branch Target Prediction Scheme with Fetch Address Prediction," Ser. No. 09/154,789, and filing date Sep. 16, 1998.

BACKGROUND

1. Field of the Invention

The present invention relates to predicting addresses of future instructions in a computer instruction stream, and more particularly to a system that predicts the address of an instruction following a branch instruction that concurrently performs a fast branch prediction operation and a slower, more-accurate branch prediction operation.

2. Related Art

Early computers generally processed instructions one at a time, with each instruction being processed in four sequential stages: instruction fetch, instruction decode, execute and result write-back. Within such early computers, different logic blocks performed each processing stage, and each logic block waited until all the preceding logic blocks completed before performing its operation.

To improve efficiency, processor designers now overlap operation of the processing stages. This enables a processor to operate on several instructions simultaneously. During a given time period, the fetch, decode, execute and write-back logic stages process different sequential instructions in a computer's instruction stream at the same time. At the end of each clock period, the result of each processing stage proceeds to the next processing stage.

Processors that use this technique of overlapping processor stages are known as "pipelined" processors. Some processors further divide each stage into sub-stages for additional performance improvement. Such processors are referred to as "deeply pipelined" processors.

In order for a pipelined processor to operate efficiently, an instruction fetch unit at the head of the pipeline must continually provide the pipeline with a stream of processor instructions. However, branch instructions within an instruction stream prevent the instruction fetch unit from fetching subsequent instructions until the branch condition is fully resolved. In pipelined processors, the branch condition will not be fully resolved until the branch condition reaches the instruction execution stage near the end of the processor pipeline. Hence, the instruction fetch unit will stall when an unresolved branch condition prevents the instruction fetch unit from knowing which instruction to fetch next.

To alleviate this problem, some pipelined processors use branch prediction mechanisms to predict the outcome of branch instructions. This typically involves predicting the target of a branch instruction as well as predicting whether the branch is taken or not. These predictions are used to determine a predicted path for the instruction stream in order to fetch subsequent instructions. When a branch prediction mechanism predicts the outcome of a branch instruction, and the processor executes subsequent instructions along the predicted path, the processor is said to have "speculatively executed" along the predicted instruction path. During speculative execution, the processor is performing useful work if the branch instruction was predicted correctly. However, if the branch prediction mechanism mispredicted the result of the branch instruction, the processor is speculatively executing instructions down the wrong path and is not performing useful work. When the processor eventually detects the mispredicted branch, the processor must flush all the speculatively executed instructions and restart execution from the correct address.

As processor cycle times continue to decrease, the branch prediction critical path must be modified so that it can operate with the decreased cycle time. This can be accomplished by either (1) simplifying the branch prediction architecture and/or reducing the size of branch prediction tables and related structures so that a branch can be predicted within a reduced cycle time, or (2) extending the branch prediction operation over more cycles.

FIG. 1 illustrates fetch pipeline execution timing for a system with single-cycle branch prediction. In FIG. 1, the operations associated with a given instruction are represented by rows. For example, the first row represents pipeline stages associated with fetch group one. (A fetch group is a block of consecutive instructions that is retrieved from a computer system's memory and stored in the computer system's instruction cache.) The operations associated with fetch group one in the first row include address generation 102, instruction I-cache-0 (I-cache-0) latency 104, I-cache-1 latency 106 and I-cache-2 latency 108. The operations associated with fetch group two in the second row include address generation 110, I-cache-0 latency 112, I-cache-1 latency 114 and I-cache latency 118. The operations associated with fetch group three in the third row include address generation 120, I-cache-0 latency 122, I-cache-1 latency 124 and I-cache-2 latency 126.

During an address generation stage, the computer system generates a predicted address for the next instruction. This predicted address may be a predicted branch target address, or it may be other addresses (as will be described below). Once this predicted address is generated, it is used to retrieve an instruction from the I-cache in the next three successive pipeline stages.

In the example illustrated in FIG. 1, the address generation stages 102, 110 and 120 take a single clock cycle. This works well for computer systems with long cycle times. However, as cycle times get progressively shorter, the address generation stage must be greatly simplified and/or the size of lookup tables within the address generation stage must be reduced in order to perform the address generation within one clock cycle. Consequently, the resulting prediction will tend to be less accurate, and computer system performance may suffer.

FIG. 2 illustrates pipeline execution timing for a system that extends branch prediction operation over two clock cycles. This allows for more accurate branch prediction than is provided by the single cycle scheme. The operations associated with fetch group one in the first row include branch target lookup 202, address generation 204, I-cache-0 latency 206, I-cache-1 latency 208 and I-cache-2 latency 210. The operations associated with fetch group two in the second row include branch target lookup 212, address generation 214, I-cache-0 latency 216, I-cache-1 latency 218 and I-cache-2 latency 220. The operations associated with fetch group three in the third row include branch target lookup 222, address generation 224, I-cache-0 latency 226, I-cache-1 latency 228 and I-cache-2 latency 230.

Note that providing two cycles for branch prediction may introduce a pipeline bubble as is illustrated in FIG. 2. In the example illustrated in FIG. 2, fetch group 2 is located at the next sequential address to fetch group 1. Hence, there is only a one-cycle delay between fetch group one and fetch group two. However, in fetch group 2, a branch is taken. Consequently, generating the predicted address for fetch group three requires two pipeline stages, branch target lookup 212 and an address generation 214. This means fetch group three cannot proceed until the result of address generation operation 214 for fetch group two becomes available after two cycles. Hence, there is a two-cycle delay between fetch group two and fetch group three.

What is needed is a system that performs branch target prediction, which does not suffer from the poor prediction performance of a single-cycle branch prediction scheme, or the pipeline bubbles of a multiple cycle branch prediction scheme.

SUMMARY

One embodiment of the present invention provides a system for predicting an address of an instruction following a branch instruction in a computer instruction stream. This system receives a current address specifying an address of a current instruction. It uses this current address (or possibly a preceding address) to generate a first select signal, which is used to select a first predicted address of an instruction following the current instruction in the computer instruction stream. At the same time the system generates a second select signal, which takes more time to generate than the first select signal but achieves a more accurate selection for a predicted address of the instruction following the current instruction. The system assumes that the first predicted address is correct and proceeds with a subsequent instruction fetch operation using the first predicted address. Next, the system compares the first select signal with the second select signal. If the first select signal is the same as the second select signal, the system allows the subsequent instruction fetch operation to proceed using the first predicted address. Otherwise, the system uses the second select signal to select a second predicted address, and delays the subsequent instruction fetch operation so that the instruction fetch operation can proceed using the second predicted address. This bi-level architecture allows branch prediction work efficiently even at the higher clock frequencies that arise as semiconductor technologies continue to improve.

BRIEF DESCRIPTION OF THE FIGURES

FIG. 3 illustrates pipeline execution timing for a bi-level branch prediction architecture that concurrently performs a single-cycle branch prediction operation, and a slower, more-accurate two-cycle branch prediction operation in accordance with an embodiment of the present invention.

DETAILED DESCRIPTION

Figure 1:
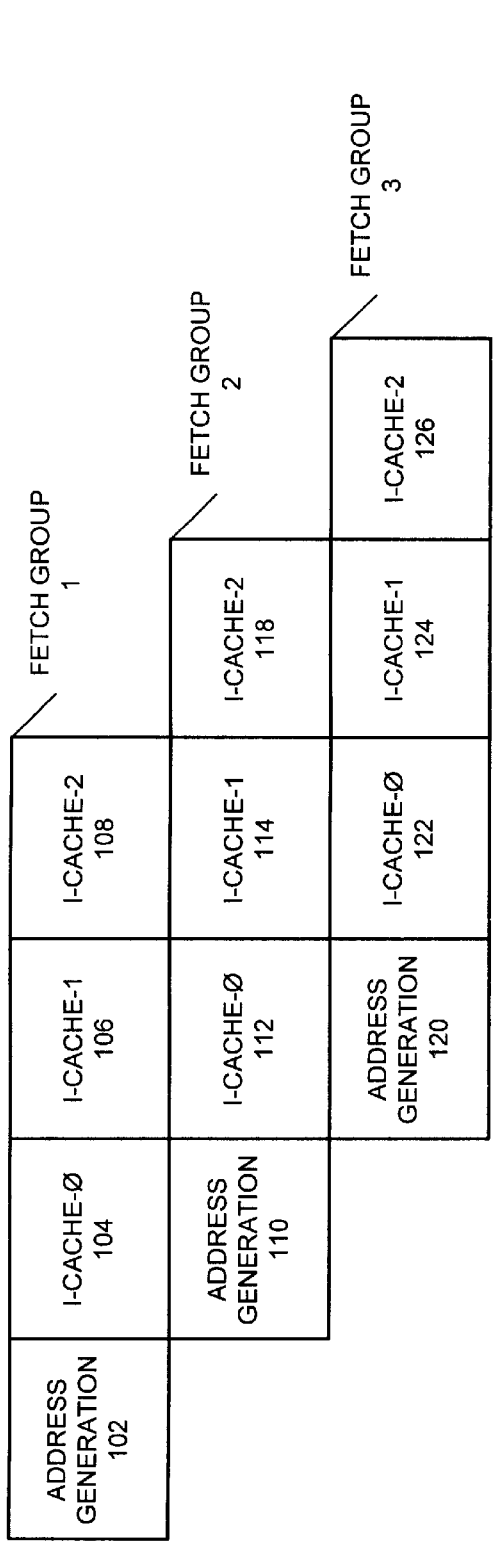
FIG. 1 illustrates pipeline execution timing for a system with single-cycle branch prediction.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Timing for Bi-level Branch Prediction Architecture

FIG. 3 illustrates pipeline execution timing for a bi-level branch prediction architecture that concurrently performs a single-cycle branch prediction operation, and a slower, more-accurate two-cycle branch prediction operation in accordance with an embodiment of the present invention. In FIG. 3, each fetch group is associated with two adjacent rows. For example, fetch group one is associated with a level one branch target prediction in row one, and a concurrent level two prediction in row two. More specifically, row one includes a single-cycle address generation operation 302, I-cache-0 latency 304, I-cache-1 latency 306 and I-cache-2 latency 308. Row two includes branch target lookup 310 and address generation 312, which comprise a two-cycle branch prediction operation. Row two additionally includes I-cache-0 latency 314, I-cache-1 latency 316 and I-cache-2 latency 318, for performing an instruction cache fetch operation. Note that this instruction fetch operation is delayed one cycle from the instruction cache operation in row 1. This is because the instruction fetch operation specified in row two cannot proceed until the two-cycle branch target address generation operation is complete. Also note that the instruction fetch operation in row two is only performed if the single-cycle predicted address from row one does not match the two-cycle predicted address generated in row two.

Similarly, fetch group two is associated with a level two branch target prediction in row three, and a concurrent level two prediction in row four. More specifically, row three includes a single-cycle address generation operation 320, I-cache-0 latency 322, I-cache-1 latency 324 and I-cache-2 latency 326. Row four includes branch target lookup 328 and address generation 330, which comprise a two-cycle branch prediction operation. Row four additionally includes I-cache-0 latency 332, I-cache-1 latency 334 and I-cache-2 latency 336, for performing an instruction cache fetch operation.

Finally, fetch group three is associated with a level one branch target prediction in row five, and a concurrent level two prediction in row six. More specifically, row five includes a single-cycle address generation operation 338, I-cache-0 latency 340, I-cache-1 latency 342 and I-cache-2 latency 344. Row six includes branch target lookup 346 and address generation 348, which comprise a two-cycle branch prediction operation. Row six additionally includes I-cache-0 latency 350, I-cache-1 latency 352 and I-cache-2 latency 354, for performing an instruction fetch operation.

Figure 2:
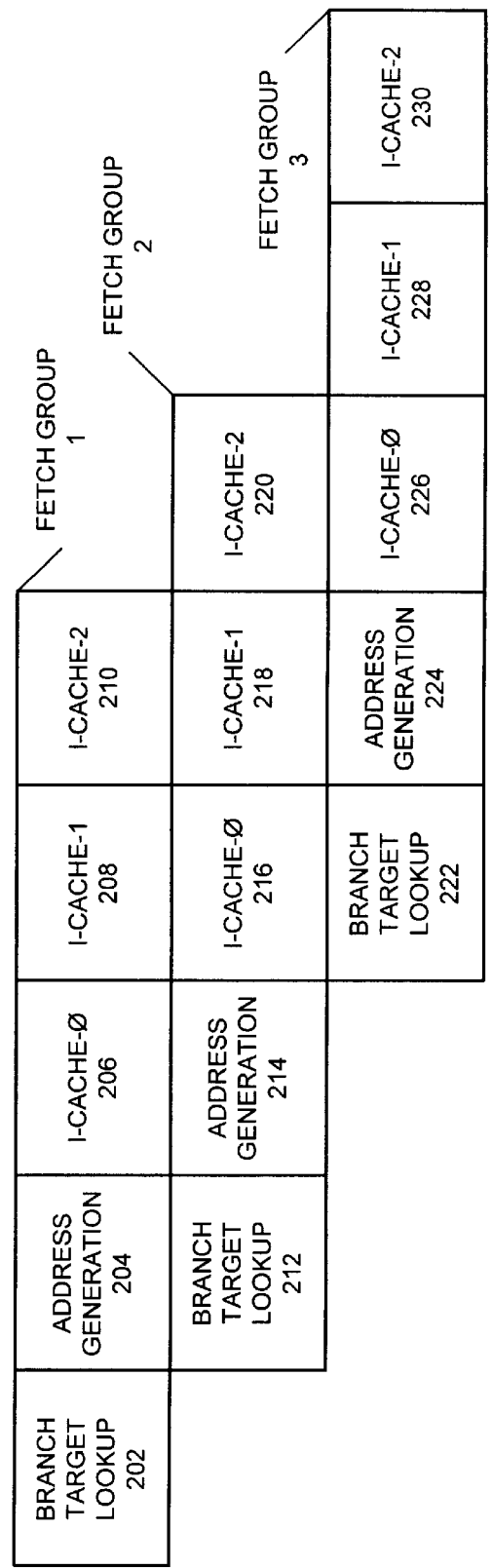
FIG. 2 illustrates pipeline execution timing for a system that extends branch prediction over two clock cycles.

Note that the bi-level scheme illustrated in FIG. 3 typically uses the results of single-cycle address predictions. This allows the system to operate without the pipeline bubbles illustrated in FIG. 2. In the infrequent case that the single-cycle address prediction does not match the two-cycle address prediction, the system introduces an additional single-cycle delay so that the instruction fetch operation can proceed using the more-accurate two-cycle branch prediction. If the two-cycle branch prediction is wrong, the system will eventually detect this fact and will have to fetch instructions from the correct branch target address.

Computer System

Figure 4:
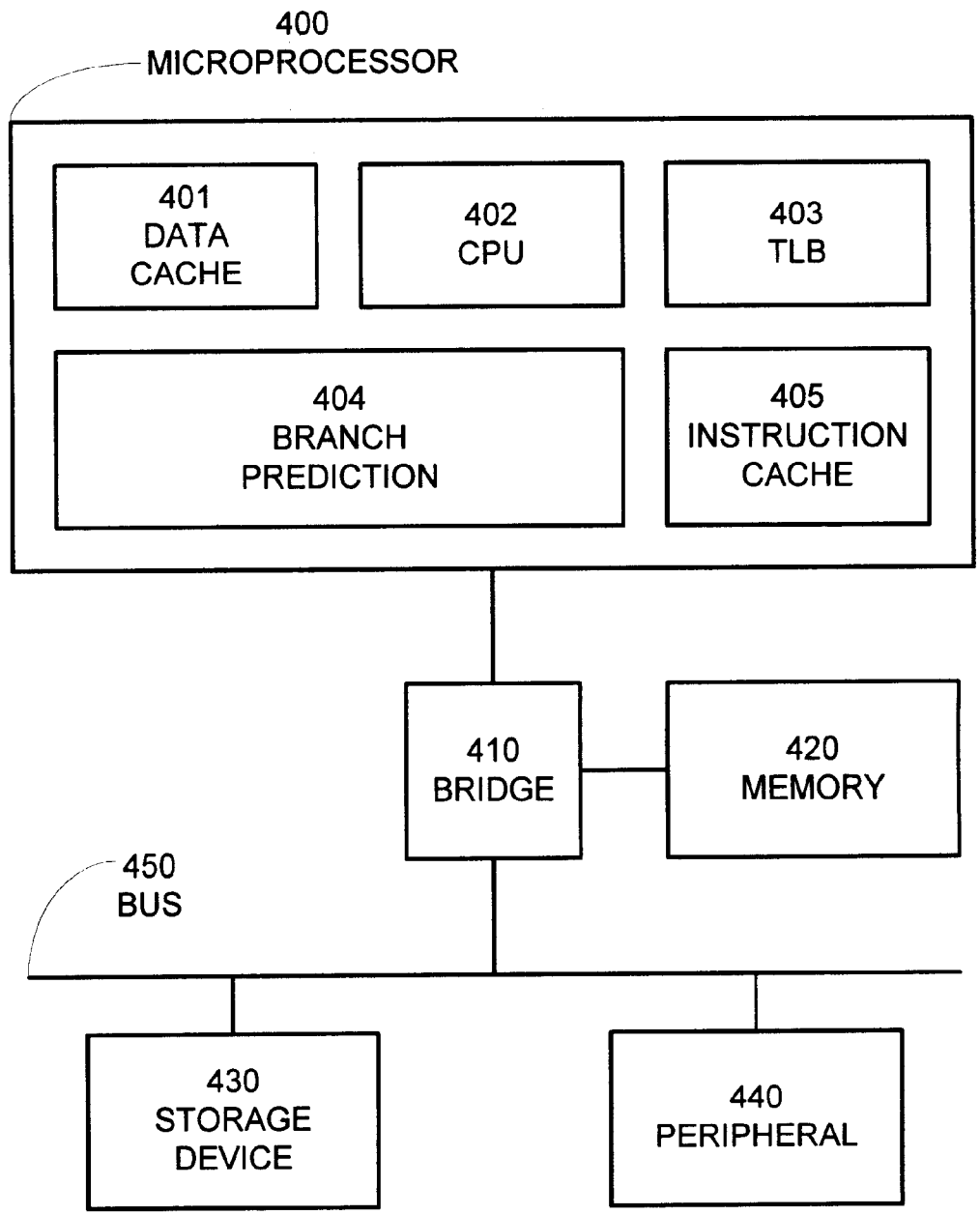
FIG. 4 illustrates a computer system including a branch prediction unit in accordance with an embodiment of the present invention.

FIG. 4 illustrates a computer system including a microprocessor 400 with a branch prediction unit 404 in accordance with an embodiment of the present invention. The computer system illustrated in FIG. 4 represents just one possible computer system out of many possible computer systems that the present invention can be applied to. In general, the present invention may be used in any computer system including a pipelined processor that performs branch prediction. This includes, but is not limited to, main frame computer systems, minicomputers, microprocessors and device controllers.

Microprocessor 400 is coupled to bus 450 and memory 420 through bridge 410. Bus 450 is coupled to storage device 430 and peripheral 440. Microprocessor 400 can communicate with memory 420 through bridge 410. Microprocessor 400 can additionally communicate with storage device 430 through bus 450. Storage device 430 contains non-volatile storage for storing data. In one embodiment, storage device 430 is a disk drive.

Microprocessor 400 can also communicate with peripheral 440 through bus 450. Peripheral 440 can be any type of peripheral device in a computing system. This includes, but is not limited to, network interface controllers, input devices, output devices and data storage devices.

Within microprocessor 400 there are a number of units, including CPU (central processing unit) 402, instruction cache 405 and data cache 401. CPU 402 executes instructions from instruction cache 405 to manipulate data from data cache 401. Microprocessor 400 also includes translation lookaside buffer (TLB) 403, which stores recently used translations from virtual page numbers to physical page numbers. Microprocessor 400 additionally includes branch prediction unit 404, which performs branch prediction for speculative execution.

Structure of Bi-level Branch Prediction Architecture

Figure 5:
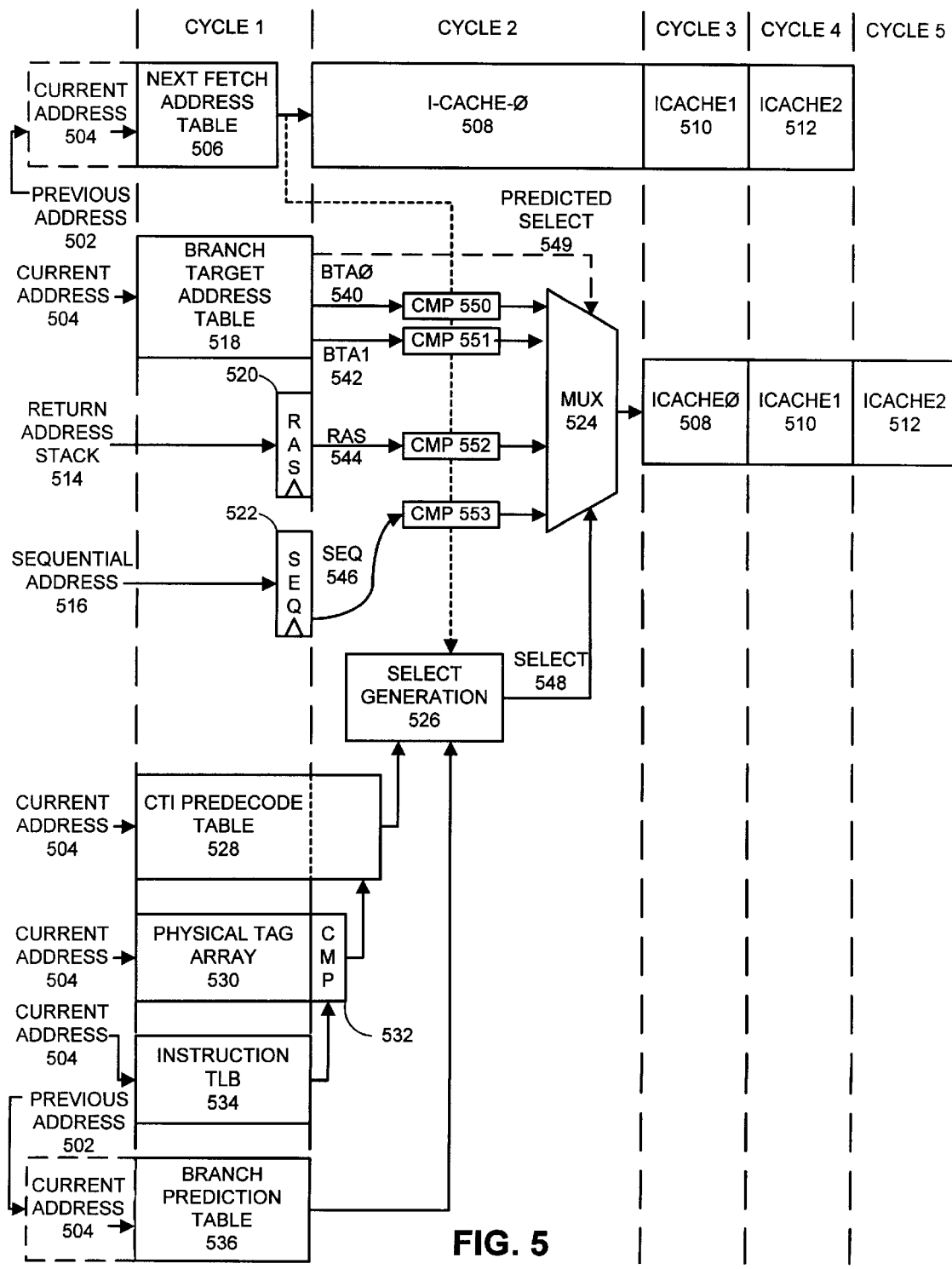
FIG. 5 illustrates the structure of a bi-level branch prediction architecture that concurrently performs a single-cycle branch prediction operation, and a slower, more-accurate two-cycle branch prediction operation in accordance with an embodiment of the present invention. It additionally illustrates a MUX select prediction mechanism.

FIG. 5 illustrates the structure of a bi-level branch prediction architecture that concurrently performs a single-cycle branch prediction operation, and a slower, more-accurate branch prediction operation in accordance with an embodiment of the present invention. The architecture in FIG. 5 is displayed in the form of a pipeline with different functional units (or circuits) that appear in different stages of the pipeline.

The simpler level one branch prediction mechanism is illustrated by the top row of FIG. 5. This mechanism includes next fetch address table 506, which takes in current address 504 and performs a lookup into historical branching information to produce a next address. This next address may be a branch target, a fall-through sequential address or a return from a function call. Because this lookup must take place in s single cycle, the size of the next fetch address table is constrained to be in the range of 4K entries.

Alternatively, the next fetch address table may be larger and may take two cycles to perform a lookup, which is indicated by the dashed lines attached to next fetch address table 506. In this case, since the lookup requires two cycles, it must be based on a previous address 502. This tends to make the prediction less accurate. However, this reduced accuracy is compensated for by the larger table, which tends to make the prediction more accurate.

Finally, the output of next fetch address table 506 feeds into a three-stage-long instruction cache fetch mechanism, which includes I-cache-0 508, I-cache-1 510 and I-cache-2 512.

The level two branch prediction mechanism is illustrated by the remainder of the circuitry in FIG. 5. The circuitry appearing in cycle one and cycle two produce a predicted address, which feeds into the same three-stage-long instruction cache fetch mechanism, which includes I-cache-0 508, I-cache-1 510 and I-cache-2 512. This instruction cache fetch mechanism appears in two places in FIG. 5 to illustrate the fact that the instruction fetch may take place in cycles 2–4 for the level one branch prediction, or in cycles 3–5 for the level two branch prediction. However, note that the instruction fetch mechanism is actually a single piece of circuitry.

The level two predicted address appears at the output of multiplexer (MUX) 524, which selects the predicted address from four inputs, including BTA0 540, BTA1, 542, RAS 544 and SEQ 546. BTA0 and BTA1 are branch target addresses that originate from branch target address table 518. Branch target address table 518 uses current address 504 to look up an entry containing two branch targets BTA0 540 and BTA1 542.

Two branch target are produced because each instruction fetch operation actually retrieves a group of eight consecutive instructions (a fetch group), and the base address for fetch group is used to predict the address of the next fetch group. Since each fetch group has more than one instruction, it is possible for a fetch group to contain multiple branch instructions. Hence, the system illustrated in FIG. 5 stores two predicted branch targets for each fetch group. BTA0 is associated with four instructions in the lower half of the fetch group and BTA1 is associated with four instructions in the upper half of the fetch group.

MUX 524 receives RAS 544 from RAS register 520, which contains the top element of return address stack 514. Return address stack 514 contains return addresses that the instruction stream can use to return from subroutine or function calls.

MUX 524 receives SEQ 546 from SEQ register 522, which is loaded with the next sequential address in the instruction stream. Hence, by selecting the next sequential address, the system is predicting that the branch will not be taken, and the instruction stream will proceed to the fall-through address.

The output of MUX 524 is selected by select signal 548, which contains four bits, one of which assumes a high value to select one of the four inputs 540, 542, 544 and 546. Select signal 548 is generated by select generation circuitry 526, which uses inputs from CTI predecode table 528 and branch prediction table 536 to generate select signal 548.

CTI predecode table 528 is a cache containing entries that that describe the type of branch instruction located at a particular instruction address. For example, a CTI entry may specify whether a particular branch instruction is a conditional branch, an unconditional branch or a return from a function call. To this end, there is a one-to-one correspondence between entries in the instruction cache 405 and entries in CTI predecode table 528. As instruction cache 405 is updated, CTI predecode table 528 is similarly updated. In order to determine which entry in the CTI predecode table 528 is being referenced, CTI predecode table 528 receives the result of a comparison between instruction TLB 534 and physical tag array 530. Note that instruction TLB 534 and physical tag array 530 comprise part of instruction cache 405, and the result of the comparison identifies which member of a set, within set-associative instruction cache 405, is currently being accessed. This identifier is used to lookup a corresponding member of a set in CTI predecode table 528.

Branch prediction table 536 contains information on whether a conditional branch instruction has been historically taken or not. In one embodiment of the present invention, branch prediction table 536 uses current address 504 to lookup an entry containing this information. This lookup must take place within one clock cycle. Consequently, the size and hence the accuracy of branch prediction table 536 is constrained by the lookup time. In another embodiment of the present invention, branch prediction table 536 uses previous address 502 to perform the lookup. In this embodiment, two clock cycles are available to perform the lookup. Hence, branch prediction table 536 can be larger than the one-clock-cycle embodiment. This tends to increase the accuracy of the branch prediction. However, basing the branch prediction on previous address 502 tends to reduce the accuracy of the prediction, which may cancel out the increased accuracy of a larger table. The correct choice between the above embodiments depends upon how the tradeoffs balance for a particular design point for the computer system.

Select Bit Prediction Embodiment

In an alternative embodiment of the present invention, MUX 524 additionally receives predicted select signal 549 from branch target address table 518. In this embodiment, branch target address table 518 stores a historic select signal for MUX 524 along with branch target information. This historic select signal becomes available sometime near the end of the first clock cycle and is used to perform a first selection for the predicted address within the first clock cycle. Note that this requires MUX 524 to complete its decoding operation within the first clock cycle, and not in the second clock cycle as is illustrated in FIG. 5. (Note that in this embodiment, next fetch address table 506 is no longer necessary, because predicted select signal 549 produces a predicted address within the first clock cycle.) Select generation circuitry 526, then proceeds to generate a more-accurate select signal 548 near the end of the second clock cycle, and these two select signals are compared with each other. If predicted select signal 549 (from the previous cycle) is the same as select signal 548, the instruction fetch operation is allowed to proceed using the address selected using predicted select signal 549. Otherwise, the instruction fetch operation is delayed by one clock cycle to allow the instruction fetch operation to proceed with a predicted address selected using the more-accurate select signal 548.

Operation of Bi-level Branch Prediction Architecture

Figure 6:
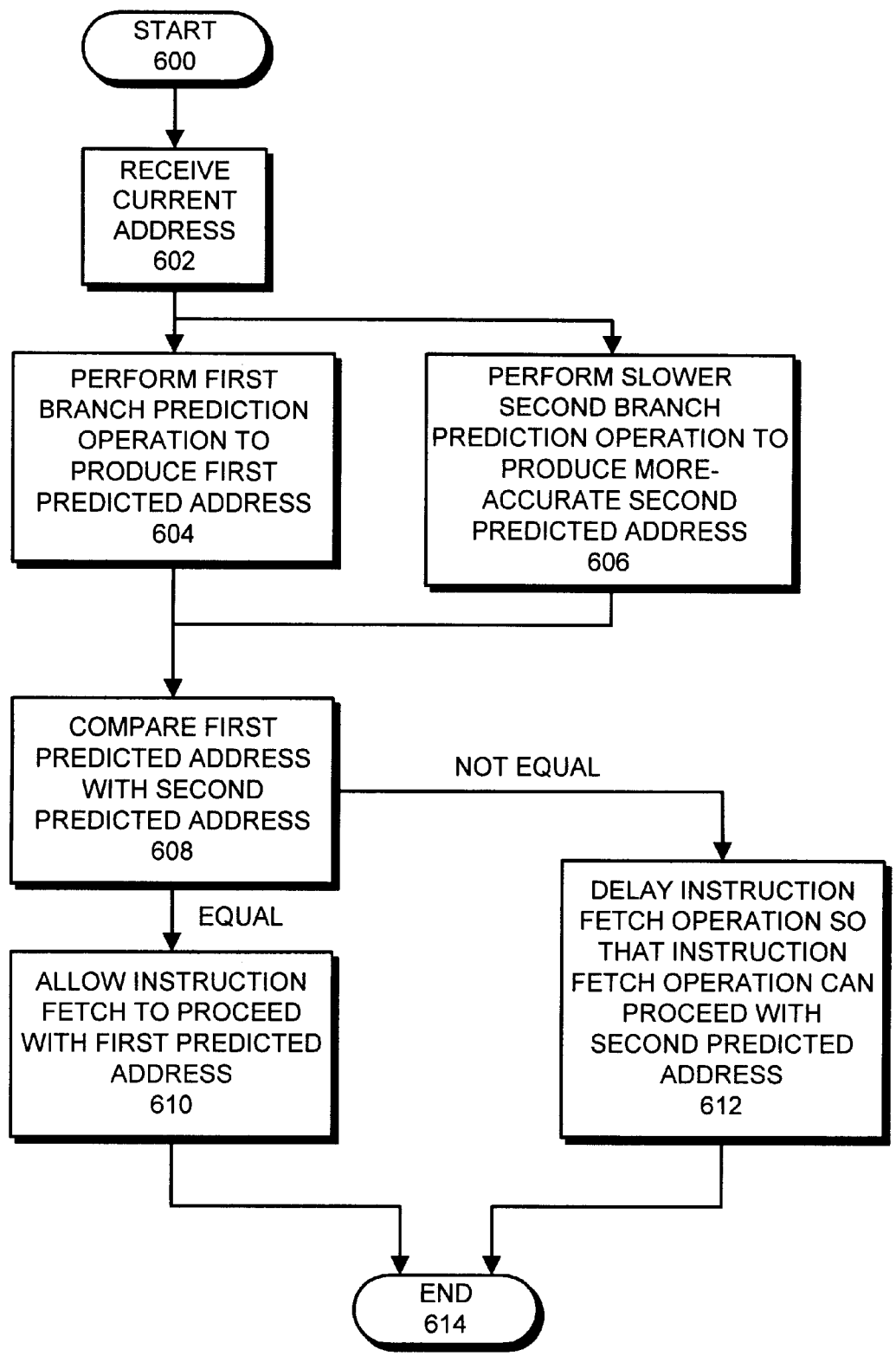
FIG. 6 is a flow chart illustrating the process of performing a branch prediction operation in accordance with an embodiment of the present invention.

FIG. 6 is a flow chart illustrating the process of performing a branch prediction operation in accordance with an embodiment of the present invention. The system first receives current address 504 (state 602). The system uses current address 504 to perform a first branch prediction operation in a single cycle to produce a first predicted address (state 604). (Recall that in an alternative embodiment, the first branch prediction operation uses previous address 502 to perform a two-cycle branch prediction.). The system also concurrently performs a slower two-cycle branch prediction operation to produce a more-accurate second predicted address (state 606). Next, the first predicted address is compared with the second predicted address (state 608). This comparison operation takes place using comparators 550, 551, 552 and 553 in FIG. 5. If they are equal, a subsequent instruction fetch operation is allowed to proceed using the first predicted address (state 610). Otherwise, the subsequent instruction fetch operation is delayed by one clock cycle so that it can proceed using the second predicted address (state 612). The above process is repeated from each successive group of instructions retrieved by the system.

Operation of Variation that Predicts Select Signals

Figure 7:
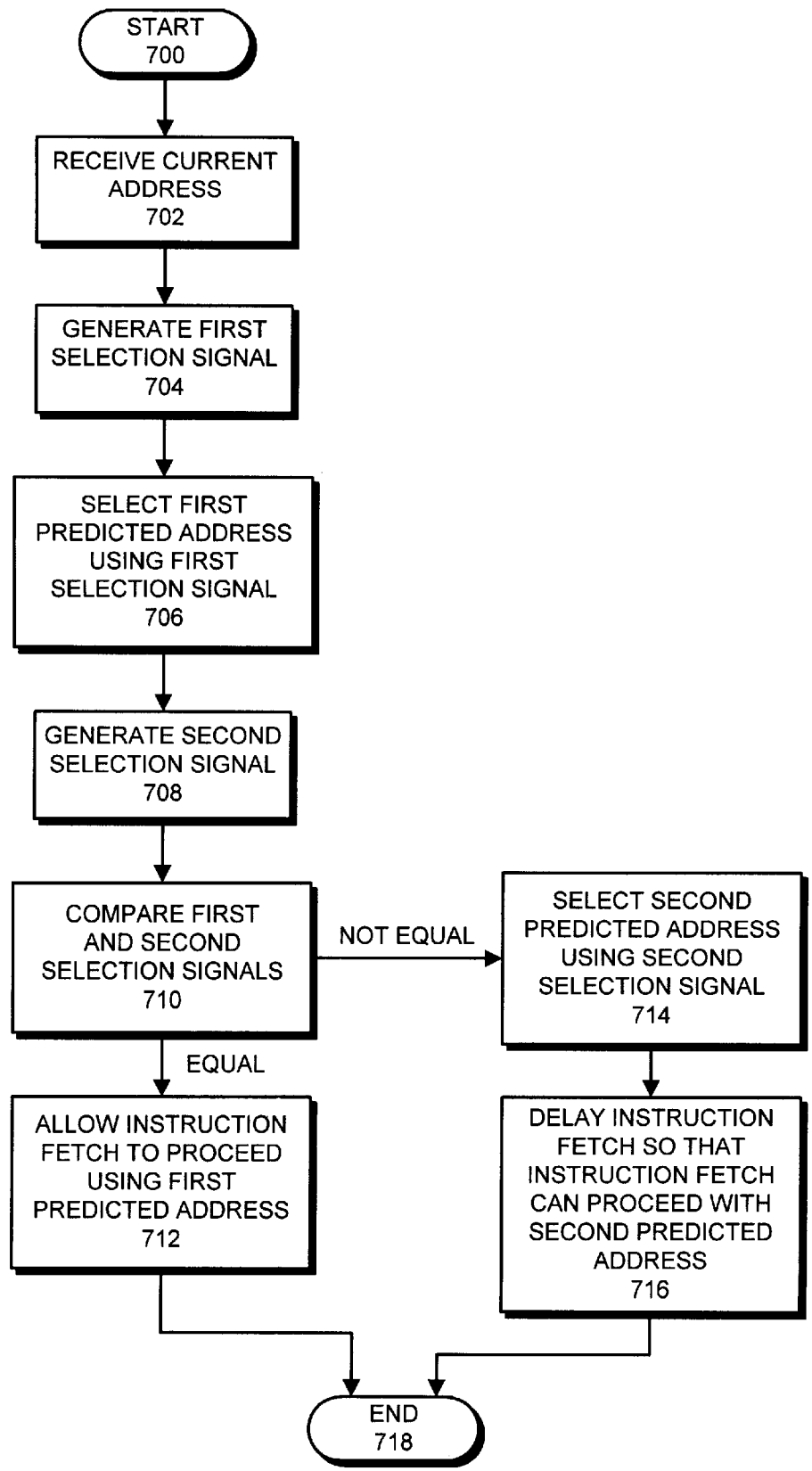
FIG. 7 is a flow chart illustrating the process of performing a branch prediction operation in accordance with another embodiment of the present invention.

FIG. 7 is a flow chart illustrating the process of performing a branch prediction operation in accordance with another embodiment of the present invention. The system first receives current address 504 (state 702). Next, the system generates a first select signal by performing a single cycle lookup in next fetch address table 506 (state 704). This first select signal is used to select a first predicted address at the end of the first clock cycle (state 706). The system also concurrently performs a slower two-cycle operation to produce a more-accurate second select signal (state 708). The first select signal and the second select signal are then compared with each other (state 710). If they are equal, a subsequent instruction fetch operation is allowed to proceed using the first predicted address (state 712). Otherwise, the second select signal is used to select a second predicted address (state 714), and the subsequent instruction fetch operation is delayed by one clock cycle so that it can proceed using the second predicted address (state 716). The above process is repeated from each successive group of instructions retrieved by the system.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for predicting an address following a branch instruction in a computer instruction stream, comprising:

receiving a current address specifying an address of a current instruction;

generating a first select signal for selecting a first predicted address of an instruction following the current instruction in the computer instruction stream;

selecting the first predicted address using the first select signal;

initiating an instruction fetch operation using the first predicted address;

generating a second select signal using the current address for selecting a second predicted address of the instruction following the current instruction, wherein the second select signal takes more time to generate than the first select signal but achieves a more accurate selection for the address of the instruction following the current instruction;

comparing the first select signal with the second select signal;

if the first select signal is equal to the second select signal, allowing the instruction fetch operation to proceed using the first predicted address; and if the first select signal is not equal to the second select signal, selecting the second predicted address using the second select signal, and delaying the instruction fetch operation so that the instruction fetch operation can proceed using the second predicted address.

2. The method of claim 1, wherein the first select signal includes select inputs for a multiplexer, which select the first predicted address.

3. The method of claim 1, wherein the act of generating the first select signal includes using the current address to look up the first select signal in a table.

4. The method of claim 1, wherein the act of generating the first select signal includes using an address preceding the current address to look up the first select signal in a table.

5. The method of claim 1, wherein:
   instructions are fetched in groups of contiguous instructions;
   the current address specifies a start address of a current group of instructions; and
   the instruction fetch operation fetches a subsequent group of instructions.

6. The method of claim 1, wherein the act of selecting the first predicted address, includes selecting the first predicted address from between, a branch target address, a next sequential address, and a return address from a function call.

7. The method of claim 1, wherein the act of selecting the second predicted address, includes selecting the second predicted address from between, a branch target address, a next sequential address, and a return address from a function call.

8. The method of claim 1, wherein the act generating the first select signal requires one clock cycle, and the act of generating the second select signal requires two clock cycles.

9. The method of claim 1, wherein the act generating the first select signal and the act generating the second select signal take place concurrently.

10. The method of claim 1, wherein the act of generating the second select signal includes, in the case of a conditional branch operation, generating the second select signal using information from a branch prediction table, which contains historic information regarding whether a branch was taken.

11. The method of claim 10, wherein the act of generating the second select signal includes using an address preceding the current address to look up an entry in the branch prediction table.

12. The method of claim 1, wherein the act of generating the second select signal includes using information from a branch type table to generate the second select signal, wherein an entry in the branch type table contains information specifying a type of branch instruction located at a particular address.

13. A method for predicting an address following a branch instruction in a computer instruction stream, comprising:
   receiving a current address specifying a start address of a current group of instructions;
   generating a first select signal for selecting a first predicted address of a group of instructions following the current group of instructions in the computer instruction stream, wherein the first select signal includes select inputs for a multiplexer, which select the first predicted address;
   selecting the first predicted address using the first select signal;
   initiating an instruction fetch operation using the first predicted address;
   generating a second select signal using the current address for selecting a second predicted address of the group of instructions following the current group of instructions, wherein the second select signal takes more time to generate than the first select signal but achieves a more accurate selection for the address of the instruction following the current group of instructions, and wherein the act of generating the second select signal includes, in the case of a conditional branch operation, generating the second select signal using information from a branch prediction table, which contains historic information regarding whether a branch was taken;
   comparing the first select signal with the second select signal;
   if the first select signal is equal to the second select signal, allowing the instruction fetch operation to proceed using the first predicted address; and
   if the first select signal is not equal to the second select signal, selecting the second predicted address using the second select signal, and delaying the instruction fetch operation so that the instruction fetch operation can proceed using the second predicted address.

14. An apparatus for predicting an address following a branch instruction in a computer instruction stream, comprising:
   an input that receives a current address specifying an address of a current instruction;
   a first select signal circuit that generates a first select signal that selects a first predicted address of an instruction following the current instruction in the computer instruction stream;
   an address prediction circuit that selects the first predicted address using the first select signal;
   a second select signal circuit that uses the current address to generate a second select signal for selecting a second predicted address of the instruction following the current instruction, wherein the second select signal takes more time to generate than the first select signal but achieves a more accurate selection for the address of the instruction following the current instruction;
   a comparison circuit that compares the first select signal with the second select signal; and
   an instruction fetch mechanism that performs an instruction fetch operation using the first predicted address, and if the first select signal is not equal to the second select signal, performs the instruction fetch operation using a second predicted address, the second predicted address being selected using the second select signal.

15. The apparatus of claim 14, wherein the first select signal includes select inputs for a multiplexer, which select the first predicted address.

16. The apparatus of claim 14, wherein the first select signal circuit uses the current address to look up the first select signal in a table.

17. The apparatus of claim 14, wherein the first select signal circuit uses an address preceding the current address to look up the first select signal in a table.

18. The apparatus of claim 14, wherein:
   the current address specifies a start address of a current group of instructions; and
   the instruction fetch mechanism is configured to fetch a subsequent group of instructions.

19. The apparatus of claim 14, wherein the address prediction circuit is configured to select the first predicted address from between, a branch target address, a next sequential address, and a return address from a function call.

20. The apparatus of claim 14, wherein the address prediction circuit is configured to select the second predicted address from between, a branch target address, a next sequential address, and a return address from a function call.

21. The apparatus of claim 14, wherein generating the first predicted address requires one clock cycle, and generating the second predicted address requires two clock cycles.

22. The apparatus of claim 14, wherein the first select signal circuit and the second select signal circuit operate concurrently.

23. The apparatus of claim 14, wherein the second select signal circuit includes a branch prediction table, which contains historic information regarding whether a branch was taken.

24. The apparatus of claim 23, wherein the branch prediction table is configured to use an address preceding the current address to look up an entry.

25. The apparatus of claim 14, wherein the second selection signal circuit includes a branch type table, which contains entries specifying a type of a branch instruction located at a particular address.

* * * * *